2,995,562
HIGHER ALKYLPYRIDINE-N-OXIDES

Donald Edward Ames, West Wickham, Kent, and Thomas Frederick Grey, Heston, Hounslow, England, assignors to Parke, Davis & Company, Detroit, Mich., a corporation of Michigan
No Drawing. Filed Jan. 16, 1959, Ser. No. 787,138
Claims priority, application Great Britain Feb. 7, 1958
7 Claims. (Cl. 260—297)

This invention relates to novel amine oxides of high anti-fungal activity and to methods for their production. Representative embodiments of this invention are alkyl, including polyalkyl, substitution products of pyridine-N-oxide wherein there is present an alkyl radical substituent having at least 8 and preferably fewer than 18 carbon atoms. Specifically excluded from the scope of this invention are alkylpyridine-N-oxides having only lower alkyl substituents.

Alkyl radicals of the type comprehended are therefore straight- and branched-chain octyl, nonyl, decyl, undecyl, dodecyl, tridecyl, tetradecyl, pentadecyl, hexadecyl, and heptadecyl radicals. In the compositions of this invention, a radical selected from this group can be present either as the sole hydrocarbon substituent or in combination with one or more additional alkyl substituents. Such additional alkyl substituents, when present, are preferably lower alkyl groups containing fewer than 4 carbon atoms.

The compounds of the present invention consequently include those which can be represented by the structural formula

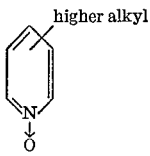
higher alkyl wherein the higher alkyl radical is an alkyl radical of the designated size, and homologous polyalkyl analogs thereof.

The compositions of this invention can be manufactured by reacting an alkylpyridine or a polyalkylpyridine containing an alkyl substituent of from 8 to 17 carbon atoms with an oxidizing reagent, whereby the corresponding amine oxide is formed. The oxidizing reagent employed can be selected from among the class of peroxy compounds consisting of hydrogen peroxide, peralkanoic acids such as performic acid and peracetic acid, peroxy acids of the aromatic series such as perbenzoic acid and perphthalic acid, inorganic peroxy acids such as monopersulfuric acid, and other organic and inorganic peroxidic reagents.

In the treatment of an alkylpyridine with a peroxidic reagent, satisfactory conversion to the desired oxide can be achieved by conducting the operation within wide limits of reaction temperature and concentration of reactants. When using perbenzoic acid as the oxidant, the oxidation reaction proceeds at a satisfactory rate with minimum formation of by-products within the temperature range of about —5 to +20° C.; with oxidants such as hydrogen peroxide in acetic acid, higher temperatures can be advantageously employed.

With certain peroxidic reagents, such as peracetic acid, the reaction can be conducted by employing an excess of the oxidant as a solvent. In most cases, it is preferred to use only a slight excess of the oxidant, such as up to a 20% excess, and to conduct the reaction in an unreactive solvent. Suitable unreactive solvents include hydrocarbons, such as benzene, toluene and xylene; halogenated hydrocarbons such chloroform, carbon tetrachloride, ethylene dibromide and chlorobenzene; carboxylic acids such as acetic acid and propionic acid; and other unreactive solvents such as ethers and esters.

Depending upon the oxidant selected, the concentrations of reactants, and the temperature, the time required for substantially complete conversion to the oxide varies from a few hours to several days. Representative reaction conditions are illustrated in the examples which follow. It is also convenient to determine the reaction time required under any given set of operating conditions by measuring the disappearance of the oxidant by such means as periodically titrating an aliquot of the reaction mixture against potassium iodide and analyzing for the iodine released.

The alkylpyridines employed as starting materials in the oxidation reaction can be obtained by the reaction of a lower alkylpyridine such as 2-methylpyridine, 3-methylpyridine, 4-methylpyridine, or another lower alkylpyridine or lower polyalkylpyridine with sodamide or potassium amide and an alkyl halide of requisite chain length. The alkylpyridines used as starting materials can also be prepared by other procedures known in the prior art.

Equivalent to the described procedures are those modifications in which the oxidation reaction is carried out on a pyridine derivative containing an additional substituent, such as the carboxyl group, which is subsequently eliminated.

The compositions of this invention are valuable anti-fungal agents which possess a high degree of activity against fungi such as *Nocardia asteroides*, *Candida albicans*, *Trichophyton interdigitale*, and *Histoplasma capsulatum*. Although alkylpyridine-N-oxides containing only lower alkyl substituents possess little or no anti-fungal activity, it is found in accordance with the practice of this invention that corresponding derivatives having an alkyl substituent of longer chain length unexpectedly exhibit high activity. Such anti-fungal activity becomes evident at a chain length of about 8 carbon atoms, attains a maximum against certain species at a chain length of about 13 carbon atoms and gradually decreases as the chain length is increased further. A particular advantage of these compounds is that they are inhibitory to fungi at concentrations which exhibit no tendency to irritate the skin. They can be employed in 2 percent or 4 percent solutions in propylene glycol for topical application.

The alkylpyridine-N-oxides encompassed herein can also be employed in the forms of their salts which are formed by reaction with a variety of inorganic and strong organic acids, and with simple organic esters.

This invention is illustrated, but not limited, by the following examples:

Example 1

A solution of 38.2 g. of 2-octylpyridine in 100 ml. of chloroform is cooled to about 0° C. While this solution is stirred continuously, a solution of 30 g. of perbenzoic acid in 500 ml. of chloroform is added. The mixture is maintained at about 0° C. for an additional 16 hours. It is then washed with four portions of 5% potassium carbonate solution and with water, dried over anhydrous sodium sulfate and evaporated. The 2-octylpyridine-N-oxide, boiling point about 140° C. at 0.7 mm., is purified by distillation. The refractive index of this compound, $n_D^{20}$ is about 1.5220. The structural formula is

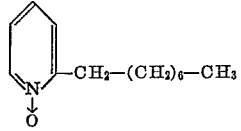

Example 2

To a solution of 43.8 g. of 2-decylpyridine, continuously stirred and kept at about 0° C., is slowly added a solution of 30 g. of perbenzoic acid in 500 ml. of chloroform. The mixture is kept cold for 16 more hours and is then washed with several portions of 5% potassium carbonate solution and with water. Upon evaporation of the chloroform solution, the product obtained is 2-decylpyridine-N-oxide.

*Example 3*

A solution of 46.6 g. of 2-(6-undecyl)pyridine, which can also be described as 2-(1-amylhexyl)pyridine, in 120 ml. of chloroform, chilled to about 0° C. and continuously stirred, is treated with a solution of 30 g. of perbenzoic acid in 500 ml. of chloroform. After refrigeration for 16 more hours, the chloroform solution is washed with several portions of dilute potassium carbonate solution and with water, and is rendered anhydrous and evaporated. The product obtained is 2-(6-undecyl)-pyridine-N-oxide.

*Example 4*

To a stirred solution of 49.4 g. of 2-dodecylpyridine in 100 ml. of chloroform, maintained at about 0° C. is gradually added a solution of 30 g. of perbenzoic acid in 1000 ml. of chloroform. Stirring is continued for an additional 16 hours at about 0° C., following which the solution is washed with four portions of dilute potassium carbonate solution and with water. It is then rendered anhydrous over sodium sulfate and brought to dryness by vaporization of the chloroform. When the residual oily product is crystallized from petroleum ether, the compound obtained is 2-dodecylpyridine-N-oxide melting at about 54–56° C.

*Example 5*

A solution of 52.2 g. of 2-tridecylpyridine in 100 ml. of chloroform, cooled to about 0° C. and stirred continuously, is treated gradually with a solution of 30 g. of perbenzoic acid in 500 ml. of chloroform. The reaction mixture is maintained at about 0° C. for an additional 16 hours. The chloroform solution is then washed with four portions of 5% potassium carbonate solution and with water, and is dried over anhydrous sodium sulfate and evaporated to yield a crude, glassy product. By crystallization from petroleum ether there is obtained 2-tridecylpyridine-N-oxide melting at about 55–56° C.

*Example 6*

To a stirred solution of 4 g. of sodamide in 50 ml. of liquid ammonia are added in small portions 9.3 g. of 3-picoline followed by a solution of 25 g. of dodecyl bromide in 25 ml. of ether. The reaction mixture is allowed to stand for about 16 hours, or for a period of time sufficient for complete evaporation of the ammonia and ether. The residue which remains is partitioned between water and ether, or between water and petroleum ether, and the desired product is isolated from the organic phase by volatilization of the solvent and fractional distillation of the residue. The fraction collected at a boiling point of about 154–156° C. at 0.6 mm. pressure is 3-tridecylpyridine. The refractive index of this compound, $n_D^{20}$ is about 1.4807.

To a stirred solution of 52.2 g. of 3-tridecylpyridine in 100 ml. of chloroform, maintained at about 0° C., is gradually added a solution of 30 g. of perbenzoic acid in 500 ml. of chloroform. The reaction mixture is kept at about 0° C. for 16 more hours and is then washed with four portions of 5% potassium carbonate solution and with water. When the non-volatile residue obtained after evaporation of the dried chloroform solution is crystallized from petroleum ether, the product obtained is 3-tridecylpyridine-N-oxide melting at about 54–55° C.

*Example 7*

A stirred solution of 52.2 g. of 4-tridecylpyridine in 100 ml. of chloroform, cooled to about 0° C., is treated gradually with a solution of 30 g. of perbenzoic acid in 500 ml. of chloroform. The solution is kept at about 0° C. for 16 more hours and is then washed with four portions of 5% potassium carbonate solution and with water. The separated chloroform phase is rendered anhydrous over sodium sulfate and brought to dryness by vaporization of the chloroform. The residue is crystallized from petroleum ether to give 4-tridecylpyridine-N-oxide melting at about 61–63° C. This compound has the structural formula

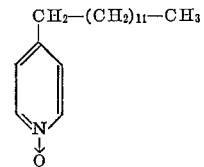

*Example 8*

A stirred mixture of 57.8 g. of 2,6-dimethyl-4-tridecylpyridine and 200 ml. of chloroform, maintained at about 0° C., is treated with a solution of 30 g. of perbenzoic acid in 500 ml. of chloroform. The mixture is kept under refrigeration for one day, following which it is washed with four portions of 5% potassium carbonate solution and with water. When the chloroform solution is dried and evaporated, the product obtained is 2,6-dimethyl-4-tridecylpyridine-N-oxide. This compound has the structural formula:

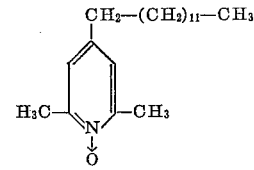

*Example 9*

To a stirred solution of 63.4 g. of 2-heptadecylpyridine in 125 ml. of chloroform, maintained at about 0° C., is added a solution of 30 g. of perbenzoic acid in 500 ml. of chloroform. The reaction mixture is kept at about 0° C. for an additional 16 hours and is then washed with four portions of 5% potassium carbonate solution and with water. The separated chloroform solution is dried over sodium sulfate and evaporated under reduced pressure. Crystallization of the residue from petroleum ether affords 2-heptadecylpyridine-N-oxide melting at about 67–67.5° C.

*Example 10*

With continuous stirring and heating under reflux, 155 g. of sodamide covered with 100 ml. of toluene is gradually treated with 315 g. of 4-picoline. The reaction mixture is cooled to room temperature, and 466 g. of dodecyl chloride is added over a 2-hour period. Stirring is continued for an additional 16 hours. The stirred mixture is then treated by the successive addition of 50 ml. of ethanol, 200 ml. of water and 500 ml. of 8% sodium hydroxide solution. The separated organic phase is washed with additional 8% sodium hydroxide solution and with water, and dried over anhydrous potassium carbonate. The residue remaining after removal of the volatile solvents is distilled in a vacuum, and the fraction boiling at about 145–150° C. at 1 mm. pressure is collected and redistilled to afford 4-tridecylpyridine.

A mixture of 10 g. of 4-tridecylpyridine and 45 ml. of glacial acetic acid is treated with 4.5 ml. of 30% hydrogen peroxide. The reaction mixture is maintained at about 20° C. for 10 days, during which time it is treated with three additional 4.5 ml. portions of 30% hydrogen peroxide, suitably on the fourth, fifth and seventh days. The reaction mixture is then poured into 200 ml. of ice-cold 20% sodium hydroxide solution. The solid product is collected on a filter, pressed free of oil and recrystallized from petroleum ether. The product obtained is 4-tridecylpyridine-N-oxide melting at about 61–63° C. This compound is identical with the product of Example 7.

What is claimed is:
1. A compound of the structural formula

wherein R is an alkyl radical containing more than 7 and fewer than 18 carbon atoms.

2. 2-alkylpyridine-N-oxide wherein the alkyl radical contains more than 7 and fewer than 18 carbon atoms.
3. 2-tridecylpyridine-N-oxide.
4. 3-alkylpyridine-N-oxide wherein the alkyl radical contains more than 7 and fewer than 18 carbon atoms.
5. 3-tridecylpyridine-N-oxide.
6. 4-alkylpyridine-N-oxide wherein the alkyl radical contains more than 7 and fewer than 18 carbon atoms.
7. 4-tridecylpyridine-N-oxide.

References Cited in the file of this patent
UNITED STATES PATENTS
2,169,976    Guenther et al. _____ Aug. 15, 1939

OTHER REFERENCES
Shimizu et al.: Chem. Abstracts, vol. 47, col. 8745 (1953).